United States Patent [19]

Becquerel

[11] Patent Number: 5,115,727
[45] Date of Patent: May 26, 1992

[54] AIR BLOWER UNIT FOR A MOTOR VEHICLE HEATING AND/OR AIR CONDITIONING SYSTEM, AND SUCH A SYSTEM HAVING TWO AIR BLOWER UNITS

[75] Inventor: Michel Becquerel, Le Mesnil-Saint-Denis, France

[73] Assignee: Valeo Thermique Habitacle, Le Mesnil-Saint-Denix, France

[21] Appl. No.: 726,887

[22] Filed: Jul. 8, 1991

[30] Foreign Application Priority Data

Jul. 16, 1990 [FR] France .................. 90 09051

[51] Int. Cl.$^5$ .............................................. B60H 1/24
[52] U.S. Cl. .................................. 454/69; 415/213.1
[58] Field of Search .................. 98/2, 2.05, 2.06, 2.07, 98/2.08, 2.11; 415/206, 213.1, 214.1; 237/12.3 A

[56] References Cited

FOREIGN PATENT DOCUMENTS

| 2143287 | 2/1973 | France. | |
|---|---|---|---|
| 43017 | 4/1981 | Japan | 98/2 |
| 130815 | 8/1982 | Japan | 98/2 |
| 152917 | 7/1987 | Japan | 98/2.05 |
| 90415 | 4/1988 | Japan | 98/2 |
| 220454 | 8/1924 | United Kingdom. | |
| 2049159 | 12/1980 | United Kingdom. | |

Primary Examiner—Harold Joyce
Attorney, Agent, or Firm—Longacre & White

[57] ABSTRACT

A heating and/or air conditioning installation for a motor vehicle is of the kind having two air blower units, each supplied with air through a respective air admission housing, and each having a volute casing arranged to deliver air into a common distribution housing.

The air blower unit comprises a connection member having an input edge which is adapted to be fitted to the outlet aperture of the air admission housing in either one of two different positions; and a casing having a lateral wall defining a volute chamber within the casing. The latter also has a delivery or outlet orifice, and two opposed abutment surfaces, either of which can be fitted to an output edge of the connection member, so as to give two different mounting positions. The blower unit further includes a motor support member having a further abutment edge which is adapted to fit to whichever one of the abutment edges of the casing is not fitted to the connection member; and a motorized blower comprising a motor secured to the motor support member and carrying a blower rotor which rotates within the casing.

7 Claims, 2 Drawing Sheets

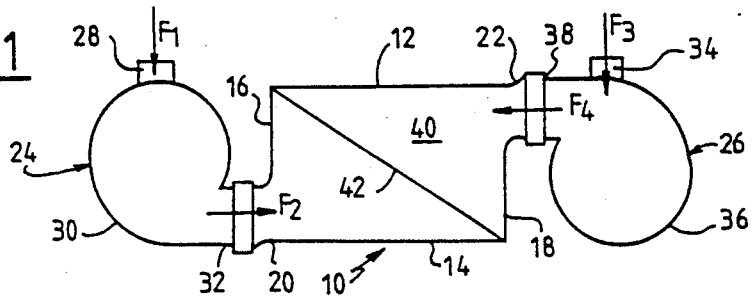
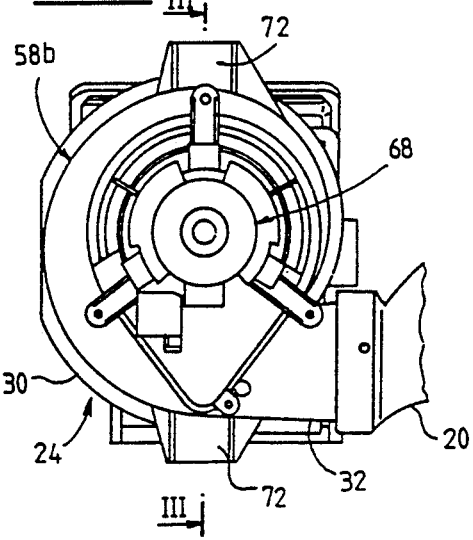
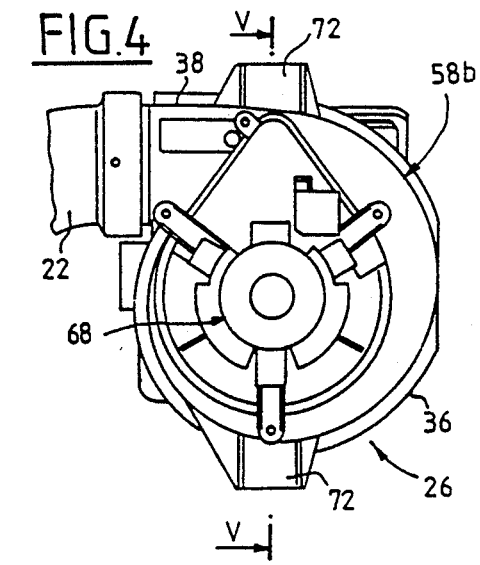
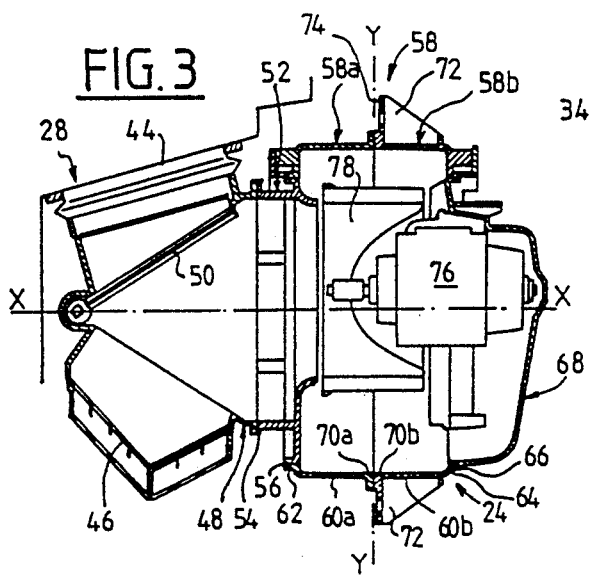
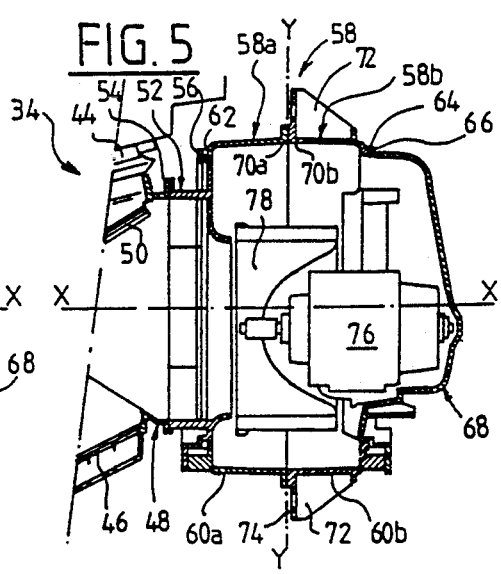

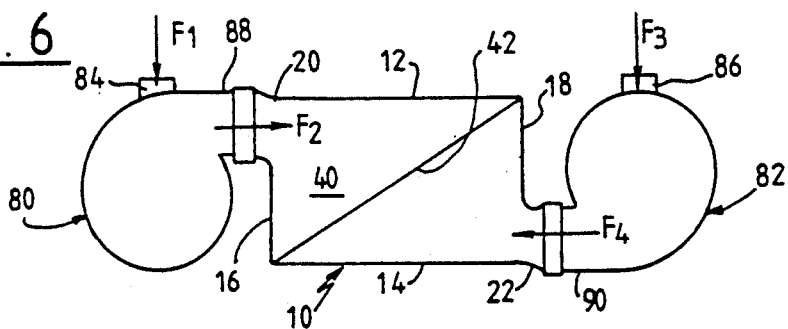
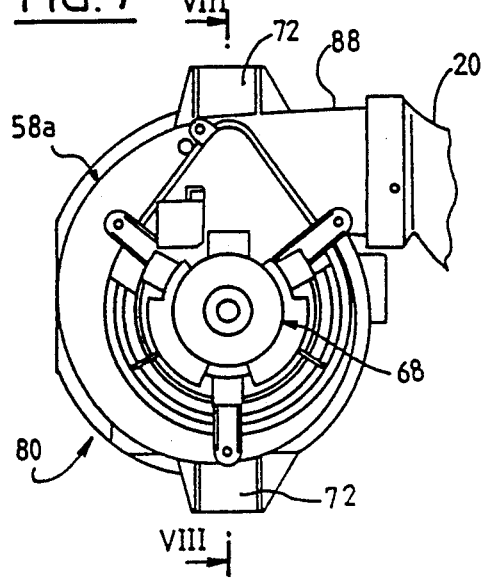
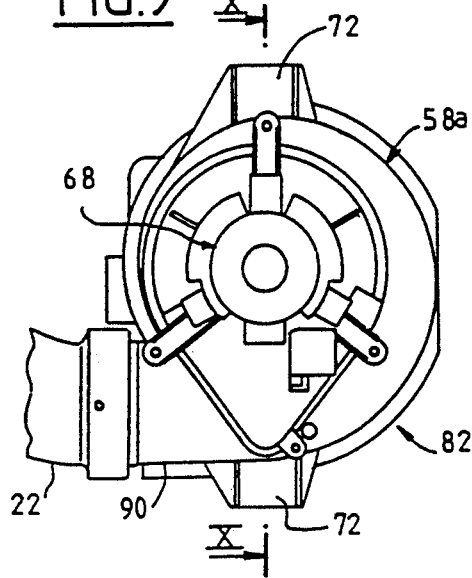
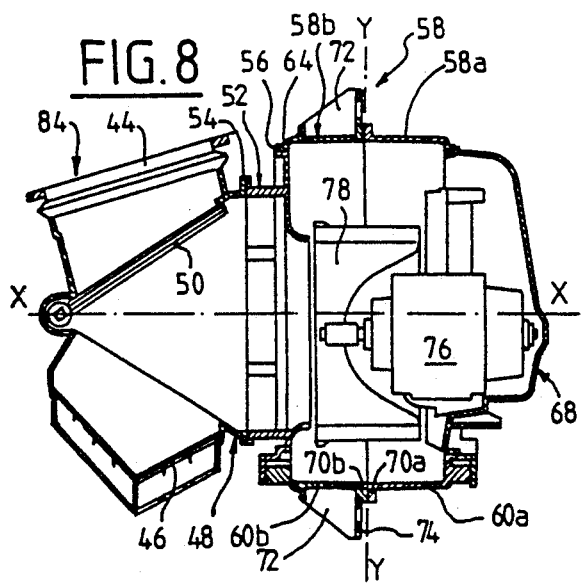
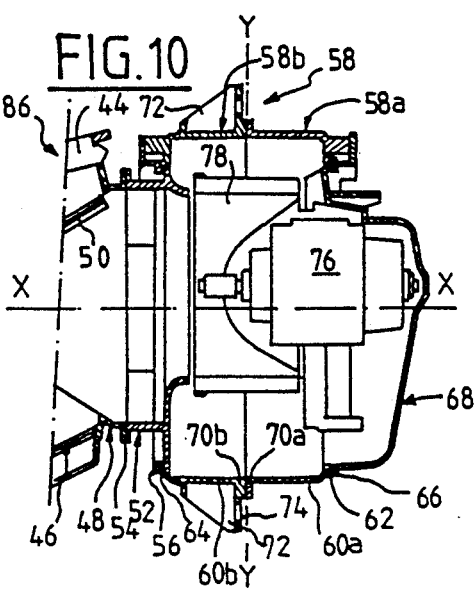

AIR BLOWER UNIT FOR A MOTOR VEHICLE HEATING AND/OR AIR CONDITIONING SYSTEM, AND SUCH A SYSTEM HAVING TWO AIR BLOWER UNITS

FIELD OF THE INVENTION

This invention relates to an air blower unit for a heating and/or air conditioning installation for a motor vehicle, and to a heating and/or air conditioning installation for a motor vehicle having two air blower units.

BACKGROUND OF THE INVENTION

It is known to mount an air blower unit at the outlet of an air admission housing for supplying the blower with air from outside the vehicle and/or with recycled air. The air blower commonly has a casing in the form of a volute, which is provided with an air inlet orifice and an air outlet or delivery orifice, and which contains a motorized blower, that is to say an assembly of a motor with a blower rotor for drawing a stream of air through the inlet orifice and for delivering it through the delivery orifice. Having regard to the configuration of the volute, the stream of air under pressure passes through the delivery orifice in a direction which is generally at right angles to the direction in which the air stream is passed through the inlet orifice.

The delivery orifice is commonly connected to the air inlet of a distribution housing which is arranged to distribute the stream of pressurised air into the cabin of the vehicle after it has been heated if required and possibly cooled if the installation is adapted for air conditioning.

In some types of vehicle in which the volume of the cabin is large, it may be necessary to provide two air blowers, the respective delivery orifices of which are connected to the two ends of a common distribution housing. One installation of this type is described in the specification of French patent application No. 90 05680 filed on 4 May 1990.

Generally the distribution housing is arranged transversely below the windshield of the vehicle, and the two air blower units are arranged respectively on the left hand side and the right hand side of the vehicle, in such a way that their delivery orifices are connected to the distribution housing at different levels. Therefore, in any given installation, it is normally necessary to provide two air blower units having different configurations, so that it is possible to dispose their respective delivery orifices with respect to the distribution housing in opposed relationship to each other.

In addition, according to the amount of space available below the fascia, it may be desirable, for two different versions of a particular vehicle, to provide in one version that the delivery orifice of the left hand air blower unit shall be at a higher level than the delivery orifice of the right hand air blower unit, or vice versa. This is typically the case in vehicles that are designed to be built in both left hand drive and right hand drive versions.

It is thus necessary to be able to provide four different configurations of air blower unit, which proliferates the number of components that have to be provided.

DISCUSSION OF THE INVENTION

A main object of the invention it to overcome this drawback.

According to the invention in a first aspect, an air blower unit for a heating and/or air conditioning installation for a motor vehicle, adapted to be mounted on the outlet side of an air admission housing, is characterised in that it comprises:

a connection member having an input edge and an output edge which are opposed to each other, the input edge being adapted to be mounted on an outlet aperture of the air admission housing in either one of two different positions which are obtained by rotation of the connection member on itself through half a turn around a first axis;

a casing comprising a lateral wall defining a volute, the casing having a delivery orifice and two opposed, identical abutment edges, adapted so that either of them can be selected to be fitted to an output edge of the connection member, whereby to define two different mounting positions selected by rotation of the casing through half a turn around a second axis perpendicular to the first axis;

a motor support member including a further abutment edge which is adapted to fit on the abutment edge of the casing that is opposed to the abutment edge fitted to the connection member; and a motorized blower comprising a motor adapted to be secured in the motor support member, together with a blower rotor which is arranged to rotate within the casing so as to draw air from the air admission housing, and to deliver it towards the delivery orifice of the volute casing.

With this arrangement, using the same components in each case, it is possible to obtain four different mounting positions for the motor blower unit with respect to the air admission housings, and consequently four different configurations for the motor blower units, which differ from each other in the orientation of the volute chamber delivery orifices with respect to the respective air admission housing to which the air blower unit is fitted. The invention therefore makes it possible to use, in a given heating and/or air conditioning installation, two air blower units which are adapted respectively to fit on two identical air admission housings, and which have different configurations corresponding simply to the two different positions of the connection member with respect to the remainder of the air blower unit. In addition, by modifying the position of the volute casing, two further air blower unit configurations are obtainable, both of which are adaptable to another type of installation.

According to a preferred feature of the invention, the two said abutment edges of the volute casing lie in parallel planes.

Preferably, the volute casing comprises two generally similar casing members, which are assembled together through junction edges extending in planes parallel to the said abutment edges.

Preferably, one of the two said volute casing members includes fastening brackets defining a fastening surface extending parallel to, and close to, an interface plane between the two said volute casing members.

The delivery orifice of the volute preferably includes means for fastening the volute to an air inlet of a distribution housing.

According to the invention in a second aspect, a heating and/or air conditioning installation for a motor vehicle is characterised in that it includes two air blower units according to the said first aspect of the invention, mounted respectively at the output sides of two identical air admission housings, and being mounted respectively on the two opposed air inlets of a distribution housing.

Preferred embodiments of the invention will now be described, by way of example only and with reference to the accompanying drawings.

DESCRIPTION OF THE DRAWINGS

FIG. 1 is a view, in elevation, of part of a heating and/or air conditioning installation for a motor vehicle, having two air blowers in a first embodiment in accordance with the invention.

FIG. 2 is a view in elevation of the left hand blower unit of the installation shown in FIG. 1.

FIG. 3 is a view in cross section taken on the line III—III in FIG. 2.

FIG. 4 is a view in elevation of the right hand blower unit of the installation shown in FIG. 1.

FIG. 5 is a view in cross section taken on the line V—V in FIG. 4.

FIG. 6 is a view in elevation of part of a heating and/or air conditioning installation for a motor vehicle having two air blower units in a second embodiment of the invention.

FIG. 7 is a view in elevation of the left hand blower unit of the installation seen in FIG. 6.

FIG. 8 is a view in cross section taken on the line VIII—VIII in FIG. 7.

FIG. 9 is a view in elevation of the right hand blower unit of the installation seen in FIG. 6.

FIG. 10 is a view in cross section taken on the line X—X in FIG. 9.

DESCRIPTION OF PREFERRED EMBODIMENTS OF THE INVENTION

Reference will first be made to FIG. 1, which shows a heating and/or air conditioning for a motor vehicle. This installation comprises a distribution housing 10 which is delimited by an upper wall 12, a bottom wall 14 and two side walls 16 and 18. The casing has a first air inlet 20 which is formed in the side wall 16 close to the bottom wall 14, and a second air inlet 22 which is formed in the side wall 18 close to the upper wall 12. The housing 10 is arranged to be mounted transversely below the windshield of a motor vehicle, with the air inlet 20 on the left hand side and the air inlet 22 on the right hand side, and with the air inlet 20 delivering at a lower level than the air inlet 22.

The air inlet 20 is arranged to be connected to a first air blower unit 24 which is arranged on the left hand side, while the air inlet 22 is similarly arranged to be connected to a second air blower unit 26 that is arranged on the right hand side. The blower unit 24 is connected to the output side of an air admission housing 28, which is connected so as to be supplied with air from outside the vehicle, or with recycled air as indicated by the arrow F1. The blower unit 24 includes a casing 30 in the form of a volute, which has a delivery orifice 32 connected to the inlet 20 of the housing 10 for introducing into the latter a stream of air under pressure as indicated by the arrow F2.

The blower unit 26 is connected to the output of an air admission housing 34, identical to the admission housing 28 and, like the latter, arranged to be supplied with air from outside the vehicle or with recycled air as indicated by the arrow F3. The blower unit 26 includes a casing 36 in the form of a volute, which has a delivery orifice 38 for introducing air under pressure into the housing 10 as indicated by the arrow F4.

The housing 10 thus receives two air streams which are introduced in two parallel but opposite directions, parallel to a base wall 40 of the housing 10. The housing has a separating bulkhead 42, which extends substantially diagonally as seen in FIG. 1, and which is fixed at one edge to the base wall 10. Therefore, the air streams which are introduced respectively via the air inlets 20 and 22 are then diverted by the separating bulkhead 42 so as to be conveyed into the interior of the cabin of the vehicle in a direction which is generally perpendicular to that of the plane of FIG. 1. An installation of the kind shown in FIG. 1 is known in principle from the specification of French patent application No. 90 05680 mentioned above.

To construct an installation of the kind shown in FIG. 1, it would normally be necessary to provide air blower units 24 and 26 having different structures, having regard to the fact that the orientation of the delivery orifice 32 with respect to the air admission housing 28 is different from that of the delivery orifice 38 with respect to the air admission housing 34. However, in the arrangement now to be described, the air blower units 24 and 26 can consist of the same components, as will be described in greater detail below.

In this connection, reference is first made to FIGS. 2 and 3, in order to describe the air blower unit 24 which is arranged on the left hand side. The air admission housing 28 has an aperture 44 which serves, for example, for the admission of air from outside the vehicle, together with another inlet aperture 46, which then serves for example for the admission of recycled air. The admission housing 28 also has an outlet aperture 48. The air blower unit 24 is attached over the outlet aperture 48 as can be seen in FIG. 3. The flow of air introduced through the inlet apertures 44 and 46 is controlled by a pivoting flap valve 50.

The air blower unit 24 includes a connection member 52 having an input edge 54 and an output edge 56, opposed to each other and lying in planes parallel to each other. The input edge 54 is arranged to be mounted on the outlet aperture 48 of the air admission housing 28, in one or other of two different positions which are obtained by rotation of the connection member 52 through half a turn around a first axis X—X. One of the positions of the connection member 52 is shown in FIGS. 2 and 3, while its other position is shown in FIGS. 4 and 5.

The air blower unit 24 also includes a casing 58, which is in two parts, namely a first casing member 58a and a second casing member 58b. The casing includes a volute defined by side walls 60a and 60b of the casing members 58a and 58b respectively. As can be seen in FIG. 2, the delivery orifice 32 is formed on this volute, and terminates the latter at its downstream end. The casing 58 has two abutment edges 62 and 64, opposed to each other and identical with each other, and arranged so that either of them can fit on the output edge 56 of the connection member 52, so as to enable the blower unit to adopt either one of two different attitudes, selected by rotation of the casing 58 through half a turn around a second axis Y—Y which is perpendicular to the first axis X—X. In the configuration shown in FIGS. 2 and 3, and also in that shown in FIGS. 4 and 5, the abutment edge 62 of the casing 58 is adapted to fit with the connection member 52, while the abutment edge 64 is adapted to fit with a corresponding abutment edge 66 formed on a motor support member 68.

The abutment edges 62 and 64 are parallel to each other, and are also parallel to the junction plane between the two casing members 58a and 58b, which are mated together in junction edges 70a and 70b respectively. One of the two halves of the volute, in this example the second casing member 58b, has two fastening brackets 72, each of which defines a fastening plane 74 extending parallel to and close to the junction plane between the two casing members 58a and 58b.

The air blower unit 24 also includes a motorized blower comprising a motor 76 which is adapted to be fixed in the motor support member 68, and a blower rotor 78 which is coupled to the motor 76, so as to be driven by the latter in rotation within the volute casing 58, to draw air from the air admission housing 28 and to deliver it towards the delivery orifice 32.

The air blower unit 26 shown in FIGS. 4 and 5 is constructed from the same components as that in FIGS. 2 and 3, the only difference being that the connection member 52, together with the casing 58 and the motor support member 68, are subjected to a rotation through half a turn around the axis X—X.

Reference is now made to FIG. 6, which shows another configuration in which the air inlet 20 is situated in the upper part of the housing 10 and the air inlet 22 in its lower part, instead of being situated respectively in the lower part and the upper part as in FIG. 1. The distribution housing 10 is connected to two air blower units 80 and 82, which lie respectively on the left hand side and the right hand side of the vehicle. These two blower units are supplied with air via two air admission housings 84 and 86 respectively, which are identical with each other and also identical with the air admission housings 28 and 34 described above with reference to FIGS. 1 to 5. The air blower units 80 and 82 are constructed from the same components as the air blower units 24 and 26 described with reference to FIGS. 2 and 3 and to FIGS. 4 and 5 respectively. They have delivery orifices 88 and 89 respectively, which are adapted to fit on the respective air inlets 20 and 22 of the distribution housing 10.

In the configuration shown in FIGS. 7 and 8, the connection member 52 lies in exactly the same position as in FIGS. 4 and 5. However, the whole of the casing 58 has here been rotated through a half turn around the axis Y—Y. The abutment edge 64 of the casing 58 is now fitted on to the output edge 56 of the connection member 52, while the abutment edge 62 of the casing 58 is now fitted on to the abutment edge 66 of the motor support member 68.

In order to convert from the configuration shown in FIGS. 7 and 8 to that shown in FIGS. 9 and 10, the connection member 52 is rotated (at the same time as the casing 58 and the motor support member 68) through a half turn around the axis X—X.

It will be seen from the foregoing that with the construction described, it is possible to obtain four different configurations of motor blower unit, using the same components in every case. For example, the installation shown in FIG. 1 may be suitable for a vehicle with left hand drive, while that shown in FIG. 6 may be more suitable for the same vehicle in a right hand drive version.

What is claimed is:

1. An air blower unit for a motor vehicle heating or air conditioning system that includes an air admission housing having an outlet aperture, wherein the air blower unit comprises: a casing defining a first casing axis and a second axis at right angles to said first axis; a motor support member carried by the casing; a connection member carried by the casing; and a motorized blower within the casing and carried by the motor support member, the connection member having an input edge and an output edge opposed to each other, with said input edge being adapted to be selectively mounted to the outlet aperture of the air admission housing in either one of two different positions selectable by rotation of the connection member on itself through half a turn around said first axis, the casing comprising a lateral wall defining a volute and a delivery orifice terminating the volute, the casing having two opposed, identical first abutment edges such that either one of the first abutment edges can be fitted selectively to said output edge of the connection member, whereby two different mounting positions of the blower unit with respect to the air admission housing are defined by rotation of the casing through half a turn around the said second axis, the motor support member having a second abutment edge adapted to be fitted in mating cooperation with either one of said first abutment edges, wherein one of said first abutment edges being opposite to the first abutment edge fitted to the connection member, and the motorized blower comprising a motor carried by the motor support member and a blower rotor coupled to the motor for drawing air from the air admission housing through the volute chamber and for delivering it under pressure to said delivery orifice.

2. An air blower unit according to claim 1, wherein said input and output edges of the connection member are in planes parallel to each other and perpendicular to said first axis.

3. An air blower unit according to claim 1, wherein said two first abutment edges are in parallel planes.

4. An air blower unit according to claim 1, wherein the volute casing comprises two substantially similar casing members, each defining a respective junction edge, with each said casing member having a respective one of said first abutment edges, the abutment edge and junction edge of each casing member being parallel to each other, and the casing members being arranged with their junction edges abutted together to form the volute casing.

5. An air blower unit according to claim 4, wherein the casing further comprises fastening brackets carried by one of said casing members, each fastening bracket defining a fastening surface extending parallel to and close to the plane in which the corresponding junction edge lies.

6. A motor vehicle heating or air conditioning system according to claim 1, comprising two substantially identical air admission housings, a distribution housing having two opposed air inlets, and two motor blower units with each motor blower unit being connected between the outlet side of a respective said air admission housing and a respective one of the air inlets of the distribution housing.

7. A system according to claim 6, wherein the two air blower units are substantially identical except that the positions of the respective connection members are different.

* * * * *